United States Patent [19]

Rodstein

[11] Patent Number: 4,966,186

[45] Date of Patent: * Oct. 30, 1990

[54] CARTRIDGE VALVE

[75] Inventor: Harvey Rodstein, Los Angeles, Calif.

[73] Assignee: Harden Industries, Inc., Los Angeles, Calif.

[ * ] Notice: The portion of the term of this patent subsequent to Apr. 25, 2006 has been disclaimed.

[21] Appl. No.: 342,452

[22] Filed: Apr. 21, 1989

Related U.S. Application Data

[63] Continuation-in-part of Ser. No. 144,781, Jan. 20, 1988, Pat. No. 4,823,832.

[51] Int. Cl.$^5$ .............................................. F16K 27/00
[52] U.S. Cl. .................................. 137/454.5; 251/304
[58] Field of Search .............................. 251/304, 310; 137/454.5

[56] References Cited

U.S. PATENT DOCUMENTS

| | | | |
|---|---|---|---|
| 3,168,280 | 2/1965 | Mueller | 251/217 |
| 3,517,696 | 6/1970 | Faure | 137/596 |
| 3,538,576 | 11/1970 | Saving | 29/157.1 |
| 3,780,758 | 12/1973 | De Vries | 137/454.6 |
| 4,077,426 | 3/1978 | Karie | 137/454.6 |
| 4,256,163 | 3/1981 | Orszullok | 137/625.31 |
| 4,314,581 | 2/1982 | Schrock | 137/454.6 |
| 4,331,176 | 5/1982 | Parkison | 137/454.3 |
| 4,425,935 | 1/1984 | Gonzalez | 137/315 |
| 4,493,338 | 1/1985 | Petursson | 137/454.2 |
| 4,738,277 | 4/1988 | Thomas | 137/454.5 |

Primary Examiner—John C. Fox
Attorney, Agent, or Firm—Jodziewicz, Matthew F.

[57] ABSTRACT

A faucet valve is operated by a rotatable stem which is inserted in a tube-shaped housing. The valve, preferably composed of brass, is screwed into a standard size plumbing fixture. The body of the stem is disposed between a washer preferably made of teflon and an "O" ring, which exerts a pressure between said body of the stem and the tube. The pressure does not generally vary according to the fluid pressure therein or fluid flow therethrough enabling the valve to be used in high pressure applications. A stationary valving member within the housing mates with a cooperating rotatable valving member which is driven by the stem. The operating end of the stem is thick relative to the housing into which it fits; this thickness allows the operating part of the stem to be able to handle relatively large operating force without bending or breaking. A pin and cooperating slot provide a 90° limit on stem rotation.

2 Claims, 3 Drawing Sheets

CARTRIDGE VALVE

This is a Continuation-in-Part application based upon application Ser. No. 07/144,781 filed on Jan. 20, 1988, and which issued as U.S. Pat. No. 4,823,832 on Apr. 25,1989.

BACKGROUND OF THE INVENTION

1. Field of the Invention

The present invention relates generally to cartridge type faucet valves and more particularly to brass cartridge type faucet valves which do not use a washer as a water seal and which are relatively maintenance-free and trouble-free.

2. Description of the Prior Art

Typically, the user of the standard faucet valve is faced with the recurring problem of dripping from the faucet spout, caused by a leaky rubber washer. In normal use, the rubber washer will eventually wear out from the frictional force of the faucet's internal parts rubbing against it by repeated opening and closing of the faucet valve. In addition, such washers can leak due to corrosion or deterioration caused by exposure to water, chemicals or minerals normally present in the water. Thus, operation of the faucet valve as well as exposure to the water can cause the water-tight seal to fail. Typically, users of such faucets had no alternative but to replace these washers regularly, entailing undue trouble, inconvenience and significant expense.

Prior art faucets typically tend to be composed of soft, expandable metal. Such soft metal is prone to corrosion or rusting. This corrosion or rusting can impart a disagreeable flavor to the water passing out of the faucet. Cleaning of such faucets is generally not feasible because the internal operating parts and the bends in the tubing make many water passageways of the faucet difficult to reach or completely inaccessible. Another alternative would be to replace the faucet hardware after such corrosion or rusting begin to have a noticeable effect on the water emitted therefrom. However, these solutions are too expensive or too time consuming to be practical.

Rust or corrosion from continual use or subjection to corroding chemicals or minerals may eventually produce a hole in the metal. The pressure of water leaking therefrom can rapidly enlarge the hole. Such leaks can not only be wasteful of water but can also, depending on the location of the leak, result in damage to the dwelling or furniture contained therein.

Plastic faucet valves are not subject to the same corrosion and rust problems as metal faucet valves. However, plastic faucet valves do have other drawbacks which may affect the health of the user. Passage of water through a plastic valve may carry with it some microscopic particles of the plastic material of the valve. Plastic is not decomposed by either digestive processes or by bacterial action. Thus, these plastic particles may accumulate in the body of a consumer. Many experts in the health sciences believe that chronic consumption of even extremely minute amounts of these plastic fibers or particles can have deleterious effects on the health of the consumer. In addition, many consumers believe that plastic containers impart a disagreeable flavor to the water or liquid contained therein. Thus, use of plastic valves may impart a disagreeable flavor to the water or other liquid passing therethrough.

Plastic also tends to be less durable than metal because of its softness and flexibility. Therefore, plastic faucet valves do not generally have the same durability that metal faucet valves have. Moreover, plastic valves are not as strong as metal valves, due to the relative weakness of the plastic material; therefore, plastic valves cannot generally handle the same kind of high pressures or abuse as metal.

Many prior art faucet valves require the holes of one part to line up with the holes of other parts in order to allow water to flow therethrough. The requirement that these holes line up is a disadvantage in the operation of such faucet valves. Since these holes have to line up in order to allow waterflow, the faucet valves tend to be either open or closed. Therefore, such faucet valves have limited variability regarding the quantity of water flowing therethrough. Thus, such faucet valves do not allow the user to control very precisely or easily the amount of water flowing through the faucet. Therefore, such faucets tend to seem rather crude in operation to the users.

Many prior art faucet valves have a thin driver stem operating the valve. Because the driver stem is thin, it is weak and tends to bend or break in usage. This can result in binding of the operating parts of the valve or failure of the entire faucet valve mechanism. Thus, such prior art faucet valves may be prone to failure and can require excessive repairs.

Typically, prior art faucet valves are unlubricated, because any form of lubrication placed in such valves would quickly be washed away. The lack of lubrication, of course, may require that excessive force be used to operate such valves; unlubricated valves may also tend to stick or bind at certain spots. This makes the faucet valve very difficult to operate. In addition, lack of lubrication increases wear.

Typically, prior art faucet valves have component parts which are screwed together. The screws and the component parts generally tend to loosen. Thus, after a period of normal use, such valves may feel very sloppy to the user. In addition, such looseness tends to result in more wear and tear on these component parts than on component parts having a more close tolerance fit. These types of units, therefore, tend to have a high frequency of repair. Such units also tend to have a somewhat awkward or imprecise feel in their operation.

SUMMARY OF THE INVENTION

1. Purpose of the Invention and Objects

A primary object of the invention is to provide a faucet valve providing a constant pressure between the rotating part or driving end and the outer body, irrespective of the quantity or pressure of water flow.

Another object of the invention is to provide a faucet valve which has a driver stem located at the upper portion of the faucet valve.

Another object of the invention is to provide a faucet valve in cartridge form adaptable for insertion in the faucet body, and having a cartridge housing which does not rotate relative to the faucet body.

A further object of the invention is to provide a faucet valve having a thick driver stem, thereby providing a strong driver stem able to handle high pressure and volume of water flow.

The present invention thus provides for an extremely easy to use faucet valve which is also relatively safe and durable. The faucet valve is designed to be used as a completely assembled unit for fast and easy replacement of old or worn out valves in standard sized faucet bodies. Applicant's faucet valve is preferably composed of brass, alleviating problems related to corrosion and rust, as well as potential toxic effects of plastic faucet valves. The construction of the tubular housing of the faucet valve allows it to be easily used with a standard sized faucet body. The structure of the faucet valve and its component parts also allow the valving members to be rotatably operable from the top or stem portion, while the tubular housing does not rotate.

A rotatable valving member, preferably composed of ceramic material, mates with a stationary valving member preferably in the form of a ceramic disc at the body portion of the stem. The ceramic disc has apertures allowing waterflow therethrough. The ceramic disc is kept in position by means of a protrusion thereon mating with a slot in the housing and an O-ring situated underneath the disc. The O-ring exerts a constant pressure against and between the stationary valving member and a fitting covering the bottom of the tubular housing. The pressure remains constant irrespective of variations in water pressure or water flow therethrough.

A washer, preferably teflon, is situated between the body portion of the stem and the housing and serves to reduce friction caused by rotation of the stem relative to the housing. The use of teflon in the washer also provides a smooth long-lasting bearing surface; the washer is permanently lubricated, therefore no re-lubrication is required.

Since the valving members and the stem are held in position within the housing by the O-ring and the teflon washer, there are no screws required to hold the valve together. Thus, there are no screws to loosen and no screws which are required to be precisely tightened.

The construction of the stem allows the use of thick driver stem which operates the valve to be used. The thickness of the stem provides strength and durability to the valve.

In summary, the apertures of the ceramic disc provide for relatively unrestrained waterflow therethrough. Moreover, the teflon washer and the bottom O-ring provide constant pressure between the stem body and the housing tube, thereby maintaining a tight fit therebetween and allowing the faucet valve to be used in high-pressure applications.

The stem body is provided at its lateral portion with a pin which is adapted to mate with an elongated slot in the housing. The pin and slot act to limit the rotational movement of the driving stem, as well as provide a 90° range of rotational movement of the stem for opening and closing the valve.

BRIEF DESCRIPTION OF THE DRAWINGS

A better understanding of the present invention may be had from a consideration of the following detailed description, taken in conjunction with the accompanying drawings in which.

DETAILED DESCRIPTION OF THE PREFERRED EMBODIMENT

Figure 1:
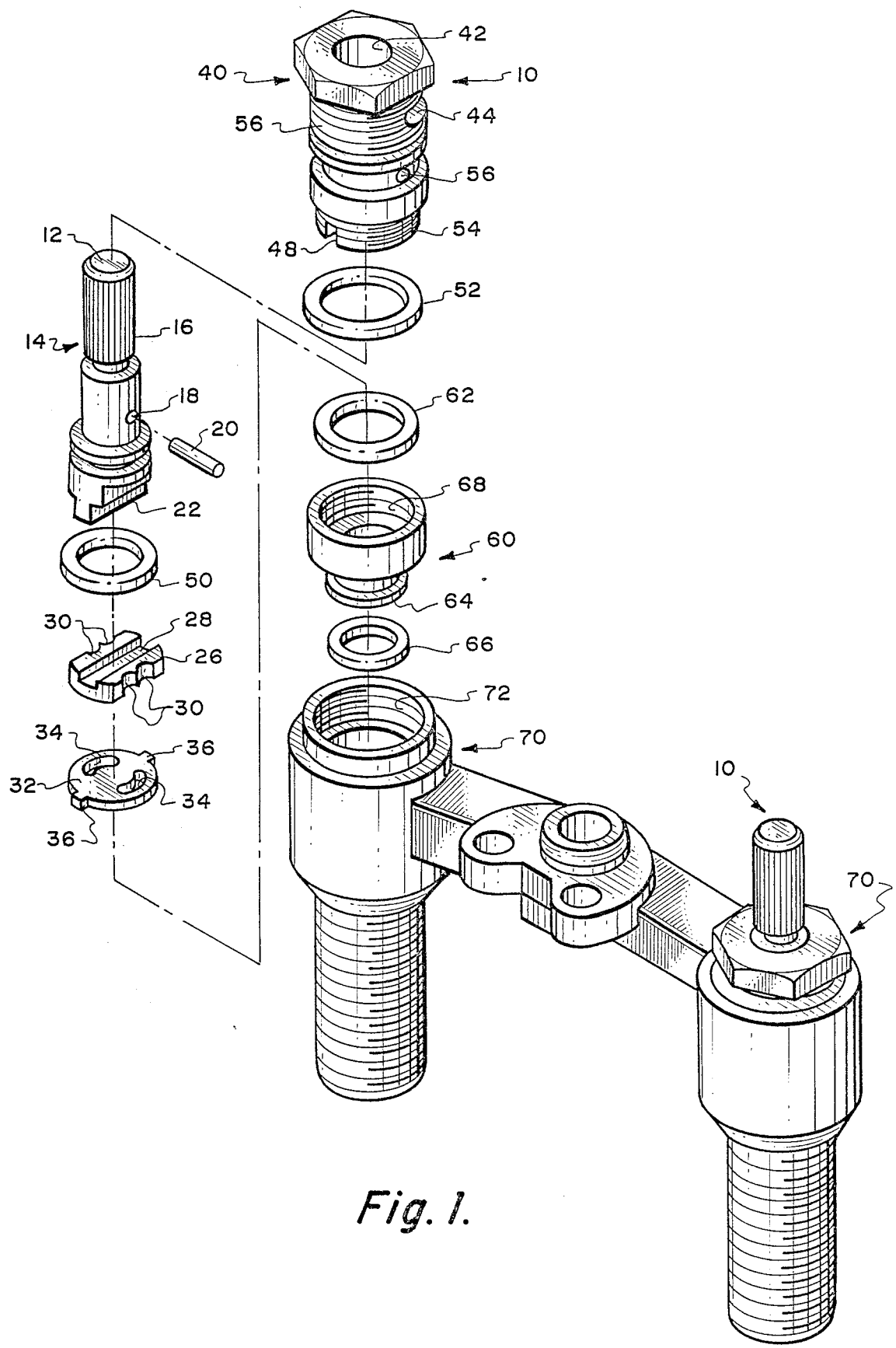
FIG. 1 is a fragmented elevational view of the faucet valve, showing the faucet body to which the valve is attached and also showing the valve inserted in the faucet body.
Figure 2:
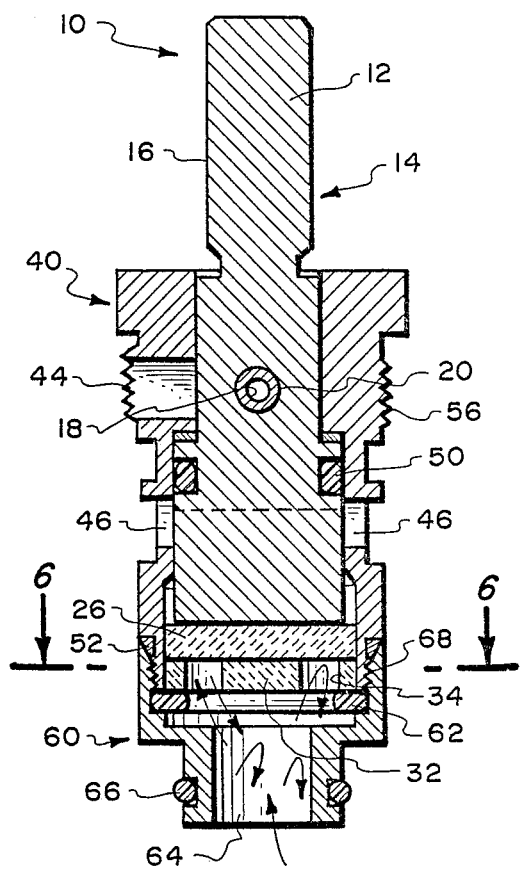
FIG. 2 is a vertical cross-sectional view of the faucet valve.
Figure 3:
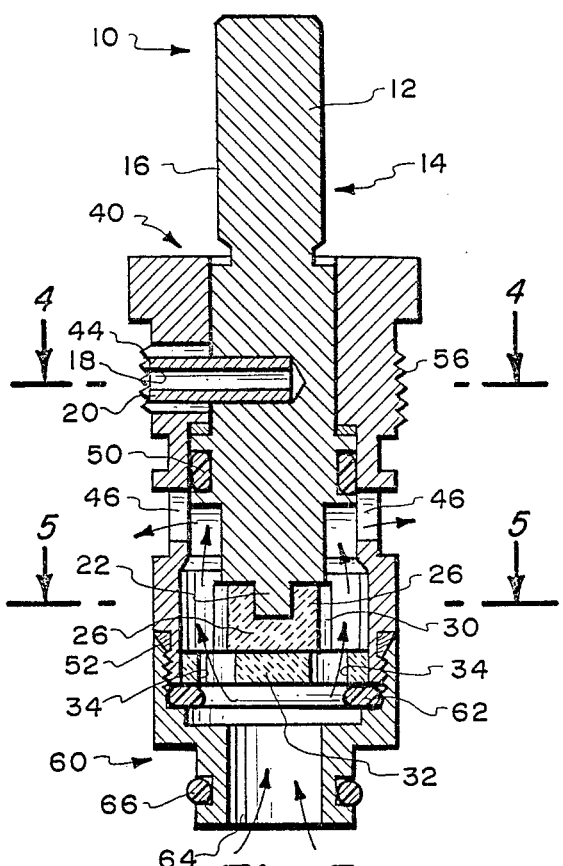
FIG. 3 is a vertical cross-sectional view of the faucet valve, wherein the position of the stem shown in FIG. 2 is rotated 90° about its vertical axis.
Figure 4:
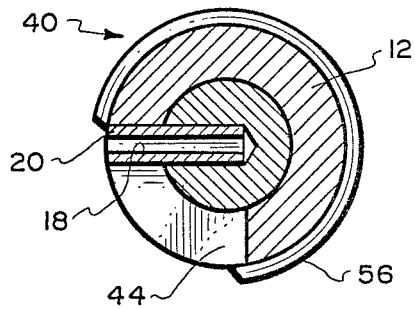
FIG. 4 is a horizontal cross-sectional view of the faucet valve taken along line 4—4 in FIG. 3.
Figure 5:
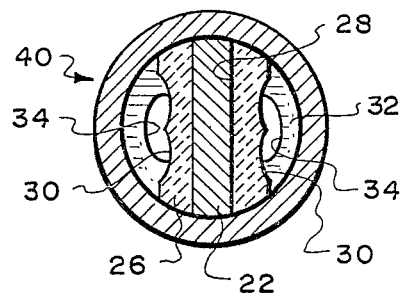
FIG. 5 is a horizontal cross-sectional view of the faucet valve taken along line 5—5 in FIG. 3.
Figure 6:
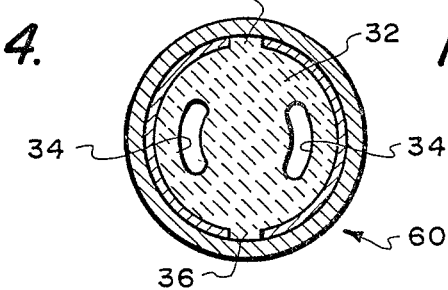
FIG. 6 is a horizontal cross-sectional view of the faucet valve taken along line 6—6 in FIG. 2.

Referring now to the drawings, there is shown the preferred cartridge valve embodiment 10, according to the present invention, for use with a faucet body generally designated at 70. The valve 10 includes three subassemblies: a tube subassembly generally designated as 40; a stem subassembly generally designated as 12; and a lower fitting subassembly generally designated as 60. The subassemblies 12, 40 and 60 fit together. Specifically, stem 12 is inserted within tube 40 and fitting 60 caps the lower part of tube 40, thereby covering the bottom of stem 12.

The stem 12 includes an upper cylindrical operating end 14, having vertical grooves 16. Grooves 16 allow for mating of a handle or other similar structure onto the stem in order to rotate the stem, thereby operating the valve 10. Stem 12 is also provided with an aperture 18 for receiving a pin 20 for a purpose which will be set forth hereinafter. Stem 12 at its lower body portion also has a driver 22 which is adaptable to rotatably engage a rotatable valving member 26 preferable by means of insertion into a slot 28 in rotatable member 26.

The interfitting driver 22 and rotatable valving member 26 allow rotation of the driver 22 to also rotate the rotatable valving member 26 in unison therewith. The rotatable member 26 abuts a stationary valving member 32 having apertures 34. Rotatable member 26 has cut out portions 30 at its opposing peripheral portions. When stem 12 is rotated to an open position, cutout portions 30 provide a passage for water flow out of apertures 34. Stationary member 32 also is provided with protrusions 36 which allow relative rotation of the valving member 26 and 32 as will be fully described hereinafter.

Tubular housing or tube 40 receives stem 12, and stem 12 is adapted to rotate within and relative to tube 40. However, tubular housing 40 does not rotate relative to faucet body 70. Tube 40 has an axial bore 42 which receives the stem 12 and through which the upper portion 14 of stem 12 protrudes. Stationary member 32 is disposed within the tube 40 at the lower portion of the tube 40; tube 40 has slots 48 which receive the protrusions 36 for retaining stationary member 32 in a stationary position relative to and within the tube 40.

Pin 20 is inserted in aperture 18 of stem 12 and is received in elongated slot 44 in tube 40; pin 20 is circumferentially movable in slot 44. Thus, pin 20 and slot 44 provide a 90° limit to rotation of the stem 12. Tube 40 also has outlets 46 laterally disposed so as to allow water to be emitted therethrough after passage through apertures 34 in the stem subassembly 12.

An inlet fitting 60, having an inlet 64 at its bottom portion, has internal threads 68 for engaging the threads 54 of tube 40. Fitting 60 serves to cap the tube 40 and retain the stem 12, the valving members 26 and 32 and related structures therein O-ring 52 i provided around the outer surface of tube 40 and positioned between tube 40 and fitting 60 in order to provide a fluid tight seal between fitting 60 and tube 40. O-ring 62 is provided within the fitting 60 and adapted to exert a pressure against the fitting 60 and against the stationary valving member and rotary valving member 26. This pressure exerted by O-ring 62 allows more precise control of water flow through the valve 10 generally irrespective of the degree of water pressure exerted within valve 10.

Figure 7:
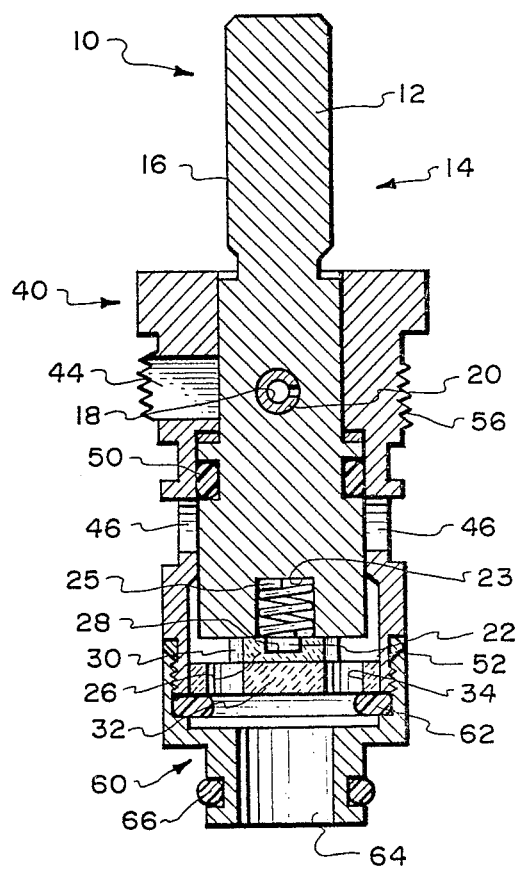
FIG. 7 is a cross-sectional view of an alternative embodiment of the faucet valve.

O-ring 62 represents merely one preferred embodiment of resilient means being positioned adjacent the first, rotating disc member 26. Another alternate preferred embodiment of resilient means being positioned adjacent the first, rotating disc member is a spring which biases the rotating disc member toward the disc retainer as illustrated in FIG. 7.

The outer surface of tube 40 is provided with threads 56 at its upper portion which are of an appropriate size to engage threads 72 of a faucet body 70, enabling the tube 40 to be screwed into a standard size faucet body 70. An O-ring 66 fits around the outer surface of the inlet 64 of said fitting 60. O-ring 66 helps provide a fluid tight seal between the faucet body 70 and the inlet 64. In addition, O-ring 50 is disposed around the outer surface of tube 40 for helping to provide a water tight seal between tube 40 and faucet body 70. All O-rings are composed of rubber or other material suitable for fluid sealing. Therefore, due to appropriate positioning of the appropriately sized O-rings, water coming in through the faucet body and entering the faucet valve at the inlet 64 will not leak around the inlet 64 or around the housing 40. Instead when the stem 12 is rotated into a open position thereby uncovering apertures 34, water coming into the faucet valve 10 from the faucet body 70 flows through apertures 34 and is emitted through outlet 46.

Except as otherwise noted, the entire cartridge valve of Applicant's invention is preferably composed of brass material. The brass enables the faucet valve to be strong, durable, corrosion-free and rust-free. In addition, water passing through Applicant's faucet valve does not leech any harmful materials, such as plastic, into the water.

In operation, after the valve 10 is screwed into valve body 70, the stem 12 may be rotated into an open position allowing water from the faucet body to flow through the apertures 34 and out of the apertures 46. Stem 12 may also be rotated into a closed position covering apertures 34 with stationary valving member 28 preventing flow of water through apertures 34. O-ring 62 continuously exerts a constant pressure against the fitting 60 and the valving members 28 and 32.

It is to be understood that the above described embodiment is merely illustrative of one of the many specific embodiments which represent applications of the principles of the present invention. Clearly, numerous and varied other arrangements may be readily be devised by those skilled in the art, without departing from the spirit and scope of the invention.

What is claimed is:

1. In a disc-type valve cartridge which includes a cartridge body member having, at a first end, exterior threads for installing the cartridge in a housing within which the flow of a fluid is to be controlled, an elongated passageway through the cartridge body member, a stem rotatable within the passageway and having handle means at one end thereof, and first and second discs disposed at a second end of the stem at the other end of the cartridge body member, the discs each having a valving face and a support face, the disc valving action being in face-to-face relationship, and the discs being relatively rotatable about the axis of the stem to provide a valving action between the disc valving faces, the first disc having its support face directed toward and secured to the other end of the stem to rotate therewith, the improvement comprising:

a disc retainer member holding the second disc with the second end of the cartridge body member in non-rotatable relation thereto, the second end of the cartridge body member having exterior threads formed thereon, and said disc retainer member having mating interior threads for purpose of its securement to the cartridge body member, and providing an axial force against the support face of the second disc; and, a biasing spring member engaged between the support face of one of the discs and the member toward which such support face is directed so as to apply face-to-face sealing pressure between the discs.

2. In a disc-type valve cartridge which includes a cartridge body member having, at a first end, exterior threads for installing the cartridge in a housing within which the flow of a fluid is to be controlled, an elongated passageway through the cartridge body member, a stem rotatable within the passageway and having handle means at one end thereof, and further having first and second discs being disposed at the other end of the stem, at a second end of the cartridge body member, the second end of the cartridge body member having exterior threads formed thereon, the discs each having a valving face and a support face, the disc valving faces being in face-to-face relationship, and the discs being relatively rotatable about the axis of the stem to provide a valving action between the disc valving faces, the first disc having its support face directed toward and secured to the other end of the stem to rotate therewith, the improvement comprising:

a disc retainer member, having interior threads thereon mating with the exterior threads on the second end of the cartridge body member for securing itself to the cartridge body member, holding the second disc at the second end of the cartridge body member in non-rotatable relation thereto said disc retainer member being secured to the second end of the cartridge body member and providing an axial force against the support face of the second disc; and resilient means engaged between the support face of one of the discs and the member toward which such support face is directed so as to apply face-to-face sealing pressure between the discs.

* * * * *